Aug. 8, 1944.  R. A. MORAVEK  2,355,318
AUTOMATIC REEL
Filed Sept. 13, 1941  11 Sheets-Sheet 1

INVENTOR.
Rudolf A. Moravek
BY
Evans, Pond & Anderson
ATTORNEYS.

Aug. 8, 1944.   R. A. MORAVEK   2,355,318
AUTOMATIC REEL
Filed Sept. 13, 1941   11 Sheets-Sheet 4

INVENTOR.
Rudolf A. Moravek
BY Soans, Pond & Anderson
ATTORNEYS.

Aug. 8, 1944. R. A. MORAVEK 2,355,318
AUTOMATIC REEL
Filed Sept. 13, 1941 11 Sheets-Sheet 8

INVENTOR.
Rudolf A. Moravek
BY Soans, Pond & Anderson
ATTORNEYS.

Aug. 8, 1944. R. A. MORAVEK 2,355,318
AUTOMATIC REEL
Filed Sept. 13, 1941 11 Sheets-Sheet 9

INVENTOR.
Rudolf A. Moravek
BY Soans, Pond + Anderson
ATTORNEYS.

Patented Aug. 8, 1944

2,355,318

UNITED STATES PATENT OFFICE 2,355,318

AUTOMATIC REEL

Rudolf A. Moravek, Neenah, Wis., assignor to Paper Patents Company, a corporation of Wisconsin Application September 13, 1941, Serial No. 410,665

15 Claims. (Cl. 242—66)

This invention relates to an improved arrangement for reeling or winding paper or other webs but more particularly paper webs as they are delivered from the drying apparatus comprising part of a paper mill.

The main objects of the invention are to provide apparatus which will effectively reel paper into rolls of uniform tautness regardless of the size of the rolls; to provide apparatus wherein the tautness of the wind is uniform from beginning to end of each roll; to provide apparatus of the character indicated in which the roll cores and the rolls are automatically handled and handled in such a manner that there will be little or no waste of paper incident to the starting of successive new rolls; to provide apparatus of the character indicated which is selectively operable to reel paper or other webs into single or double ply rolls; and in general it is the object of the present invention to provide an improved reeling apparatus of the character mentioned.

Other objects and advantages of the invention will be understood by reference to the following specification and accompanying drawings (10 sheets) wherein there is disclosed automatic reeling mechanism embodying a selected form of the invention.

The apparatus herein disclosed comprises a pair of drums 25 and 26 respectively, suitably journaled in bearings 27 and 28 carried by upstanding frame sides such as indicated at 29. The frame sides 29 may be mounted on a bed plate such as indicated at 30 or otherwise suitably supported.

The rolls or drums 25 and 26 are independently driven, preferably by means of variable direct current electric motors 31 and 32 respectively, which may receive their power from a common source.

For controlling the motors 31 and 32, there is preferably employed some suitable arrangement whereby the motors, and the drums 25 and 26, will be driven at a predetermined speed relation to the speed of the drying cylinder, or like delivery end of a paper machine or the like. One example of controlling means is shown in the diagrammatic illustration, Fig. 21, wherein the drying cylinder of a paper machine is represented at 200. One element of a "Harland" regulator 201, a commercially available device, is driven by the receiver 202 of a pair of so-called "synchrolock" motors, the other unit 203 thereof being connected to the drying cylinder drive motor.

Figure 21:
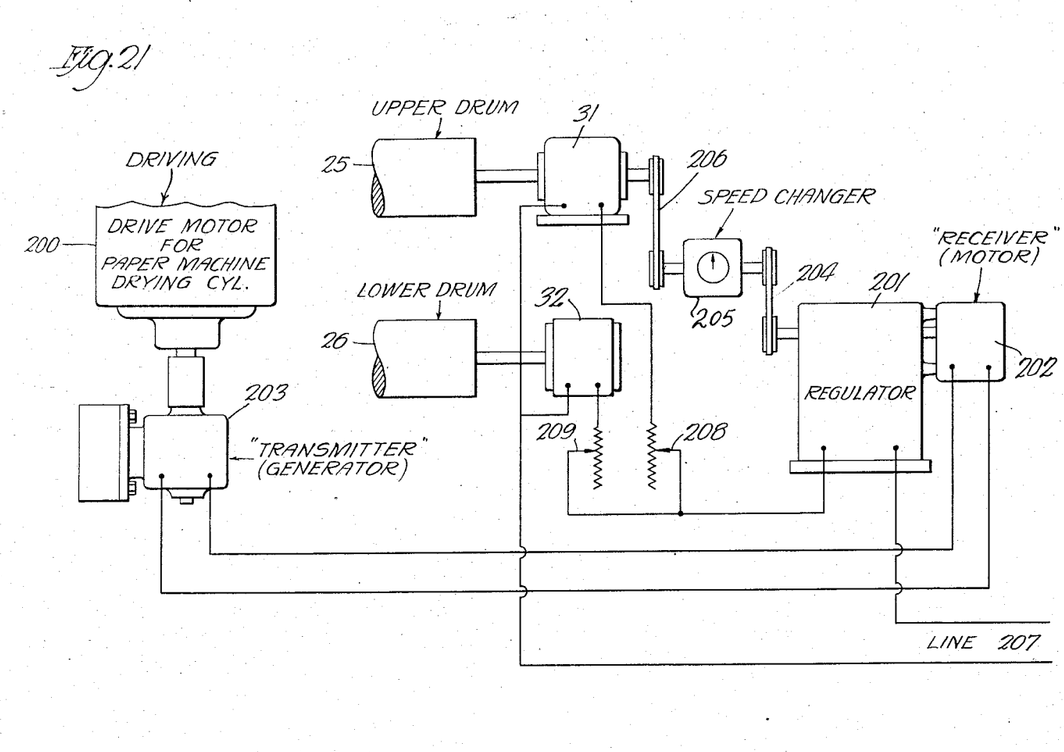
Fig. 21 is a diagram of the control circuits.

The unit 203 is a generator, the output of which is determined by the rotation imparted to its armature by the drying cylinder drive motor 200, and the unit 202 is a motor which is driven in exact or other predetermined relation to the drive of the drying cylinder motor 200 and unit 203.

The regulator unit 201 has another element driven by a suitable connection 204 to an adjustable speed changing or varying device 205 which is in turn driven by a suitable connection 206 to the driving motor 31 for the upper drum 25. The regulator 201 controls the electrical voltage delivered from the power line 207 to the drum motors 31 and 32 so as to cause the same to operate at a predetermined constant speed relationship to the drying cylinder speed. For practical purposes, the speed of rotation of the drums 25 and 26 and the drying cylinder should be substantially equalized. Independent variation of the drive of the drums 25 and 26 may be provided by including manually adjustable rheostats 208 and 209 in the circuits to the motors 31 and 32.

Figures 22, 23:
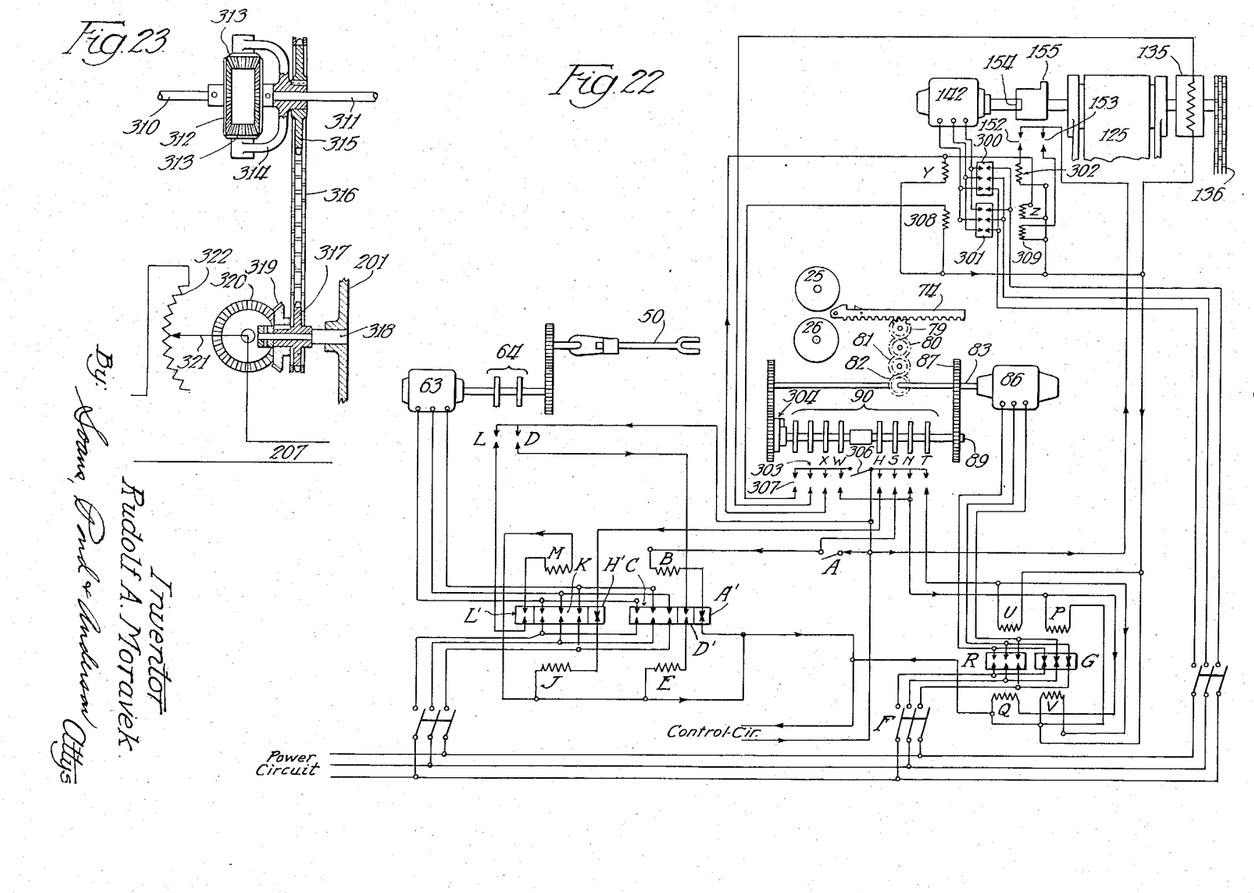
Fig. 22 is a wiring diagram.
Fig. 23 is a schematic illustration of a type of regulator mechanism forming a part of the automatic reel herein described.

The regulator 201 may embody various types of mechanism, one form of which is typified by the structure represented in Fig. 23. Two shafts, 310 and 311, are inter-connected by a differential gear mechanism indicated in its entirety at 312. The shaft 310 may represent the shaft driven by the belt 204 (Fig. 21) and the shaft 311 may represent the shaft driven by the receiver or motor 202. The planetary gears 313 of the differential mechanism are carried by a suitable spider 314 which is rotatable on the shaft 311, and said spider 314 has secured to it a sprocket 315.

The sprocket 315, through the agency of a chain 316, is adapted to drive a sprocket 317, rotatably supported on a short shaft 318 carried by the wall, or a suitable bracket part of the regulator 201. A miter gear 319 rigidly connected to the sprocket 317 so as to rotate therewith, meshes with a corresponding miter gear 320, which is suitably supported for rotation about its axis, and said miter gear 320 carries an electrical contact arm 321, which is electrically connected to one side of the electrical line 207.

The movable contact arm 321 co-operates with a stationary resistance, or rheostat element 322, which is suitably mounted in the regulator casing, one end of said resistance element being suitably electrically connected to the rheostats 208 and 209 (Fig. 21).

Under normal operating conditions, that is, when the shafts 310 and 311 are driven at the same speed, the planetary gear supporting spider 314 and sprocket 315 will remain stationary and electrical power will accordingly flow at a set rate through the regulator rheostat 322. However, in the event that either of the shafts 310 or 311 rotates relative to the other, there will be a corresponding rotary movement of the spider 314 and sprocket 315 which will be transmitted to the rheostat arm 321, which will accordingly move along the resistance element 322 to adjust the electrical power supply to the motors 31 and 32.

Figures 8, 9, 10, 11:
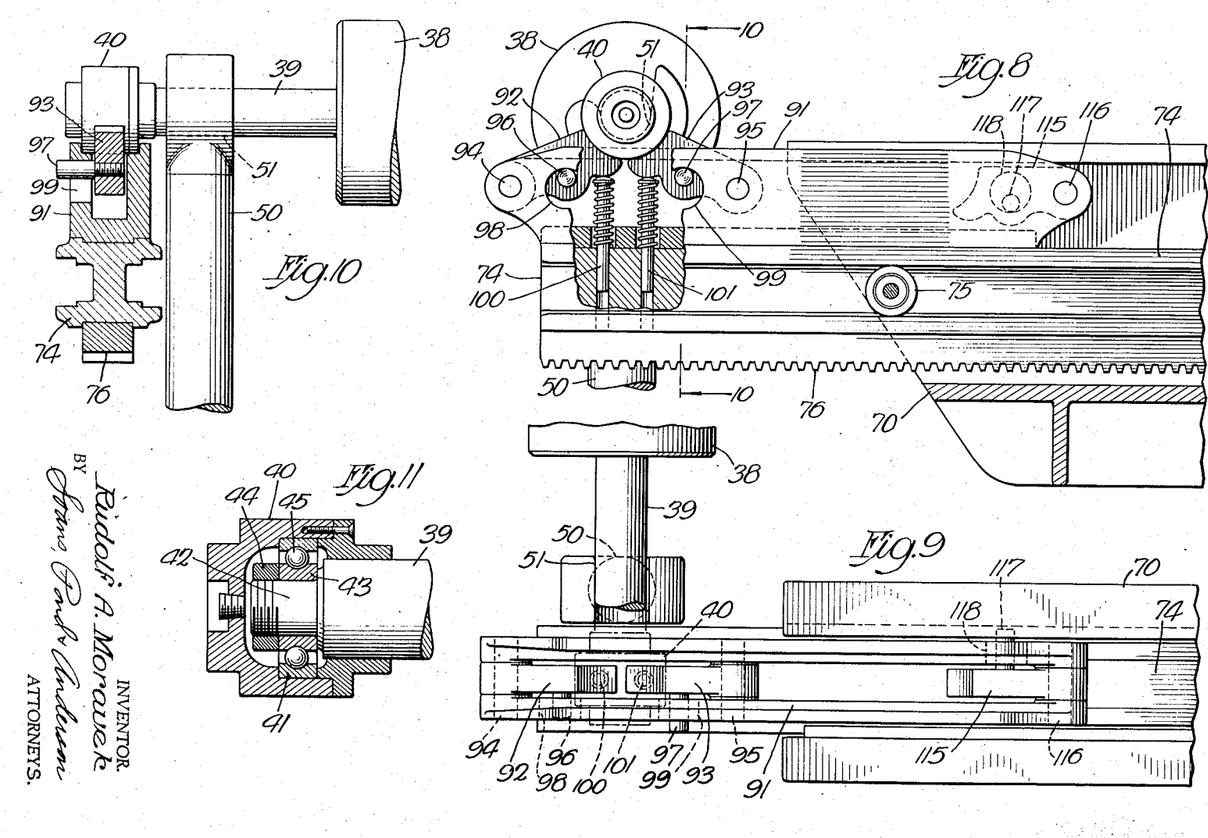
Fig. 8 is a fragmentary side elevation of part of the mechanism shown also in Fig. 3 but on an enlarged scale with certain parts broken away and shown in section to more clearly illustrate certain details.
Fig. 9 is a plan of the mechanism illustrated in Fig. 8.
Fig. 10 is a section on the line 10, 10 of Figure 8.
Fig. 11 is a cross-section of a bearing structure employed in connection with each core shaft.

Empty core shafts are supported on a pair of downwardly inclined tracks 35 and 36 (see Figs. 1 and 6), the latter being of upwardly facing channel shape and suitably supported by posts, brackets or like connections to the bed plate 30 or other parts of the apparatus. The core shafts each comprise the core body proper indicated at 38, endwise extending shafts 39 and suitable antifriction bearings 40 carried by the end of each shaft 39. As best shown in Fig. 11, each bearing 40 comprises a two-part housing which supports the outer member or ball race 41 of an antifriction bearing. The inner part of the bearing 40 fits freely around the adjacent end portion of the shaft 39 so as to permit free turning of the shaft within the bearing housing. The shaft 39 has a reduced end extension 42 on which is seated the inner ball race 43 of the anti-friction bearing, and a nut 44 threaded on the free end of the reduced extension 42 serves to lock said inner ball race in place on said shaft extension 42. Ball bearings indicated at 45 interposed between the inner and outer races of the bearing member serve to rotatably support the shaft 39 in the bearing house 40.

Figures 3, 4, 5:
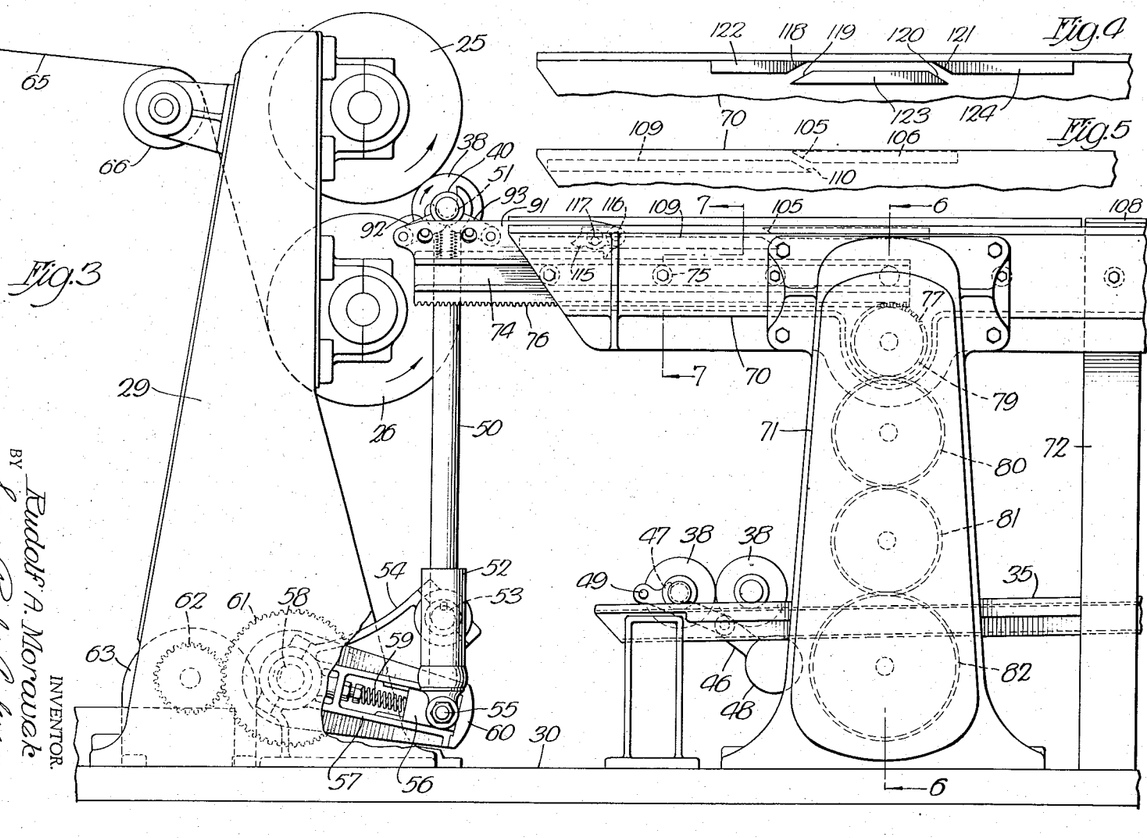
Fig. 3 is a fragmentary side elevation corresponding to a portion of Fig. 1 but on an enlarged scale and showing certain parts in a changed position.
Figs. 4 and 5 are detailed illustrations of certain cam arrangements, one of which also is shown in Fig. 3.
Figures 6, 7:
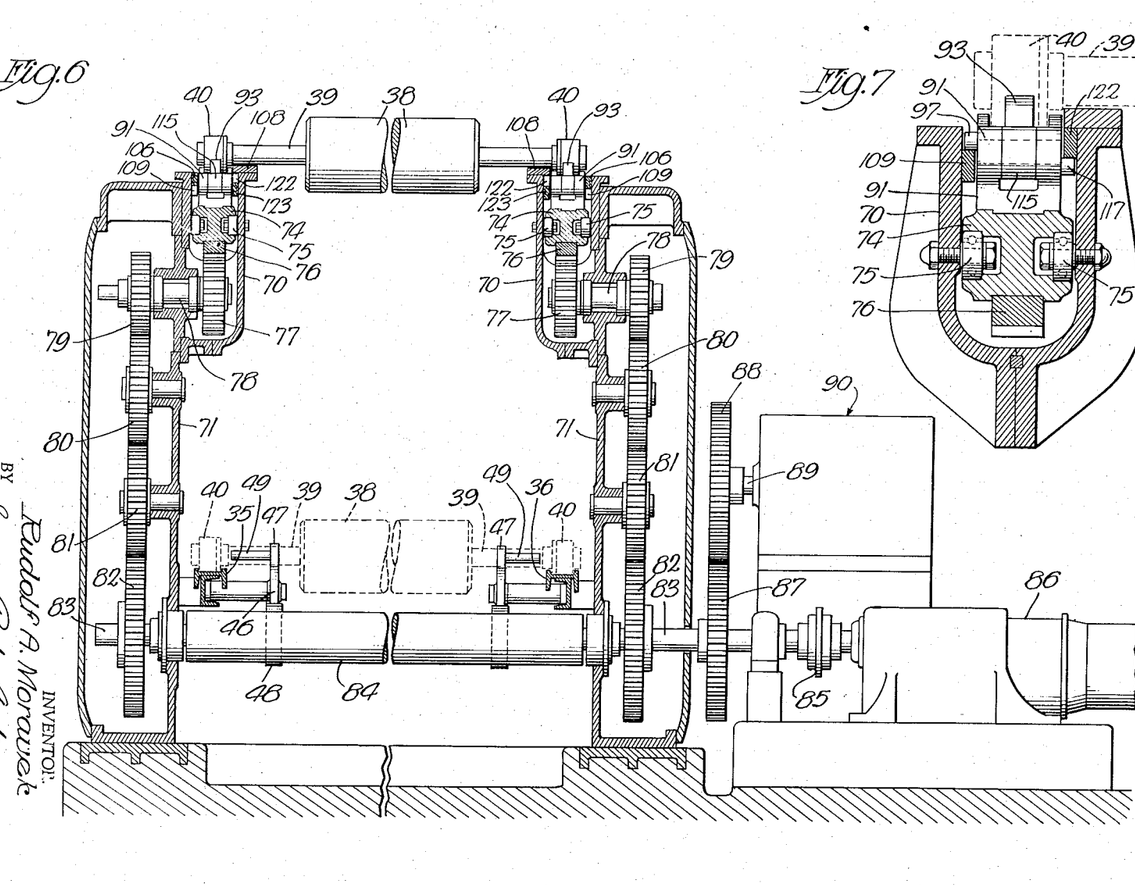
Figs. 6 and 7 are cross-sections on the lines 6, 6 and 7, 7 respectively on Fig. 3.
Figure 12:
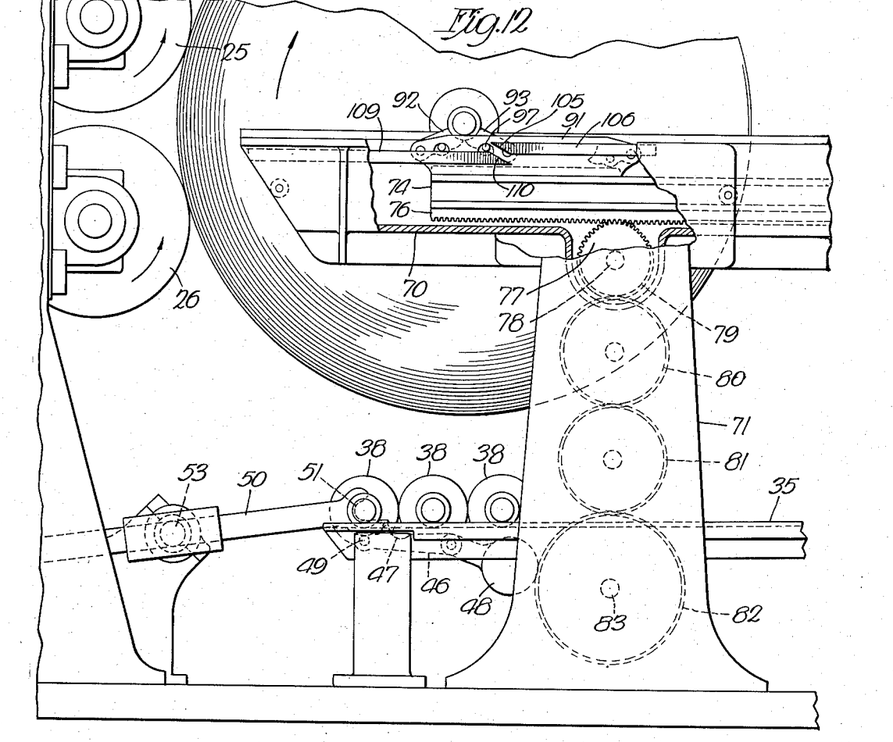
Figs. 12 and 13 are fragmentary side elevations wherein certain parts are broken away and shown in sections to reveal various details of construction and respectively showing changed positions of the mechanism.

The core shafts equipped with bearings as above described roll by gravity toward the lower or delivery end of the tracks 35 and 36 where they are stopped by means of a latch arrangement best shown in Figs. 3, 6 and 12.

The said latch arrangement comprises an arm 46, one in association with each track 35 and 36, pivoted to the respective tracks and provided at one end with a hook formation indicated at 47 and at its other end with a counterweight 48. The counterweight 48 serves to normally rock the arm 46 so as to cause its hook 47 to engage the adjacent shaft portion 39 of the core shaft 38 to thereby hold it on the tracks. The arms 46 are each extended at their respective hooks 47 and support transversely outwardly extending pins 49 which serve a purpose presently to be explained.

For paper-winding purposes, a core shaft 38 is automatically carried upwardly from the delivery end of the tracks 35 and 36 into the nip or bight of the pair of drums 25 and 26, substantially as shown in Fig. 3.

Figure 2:
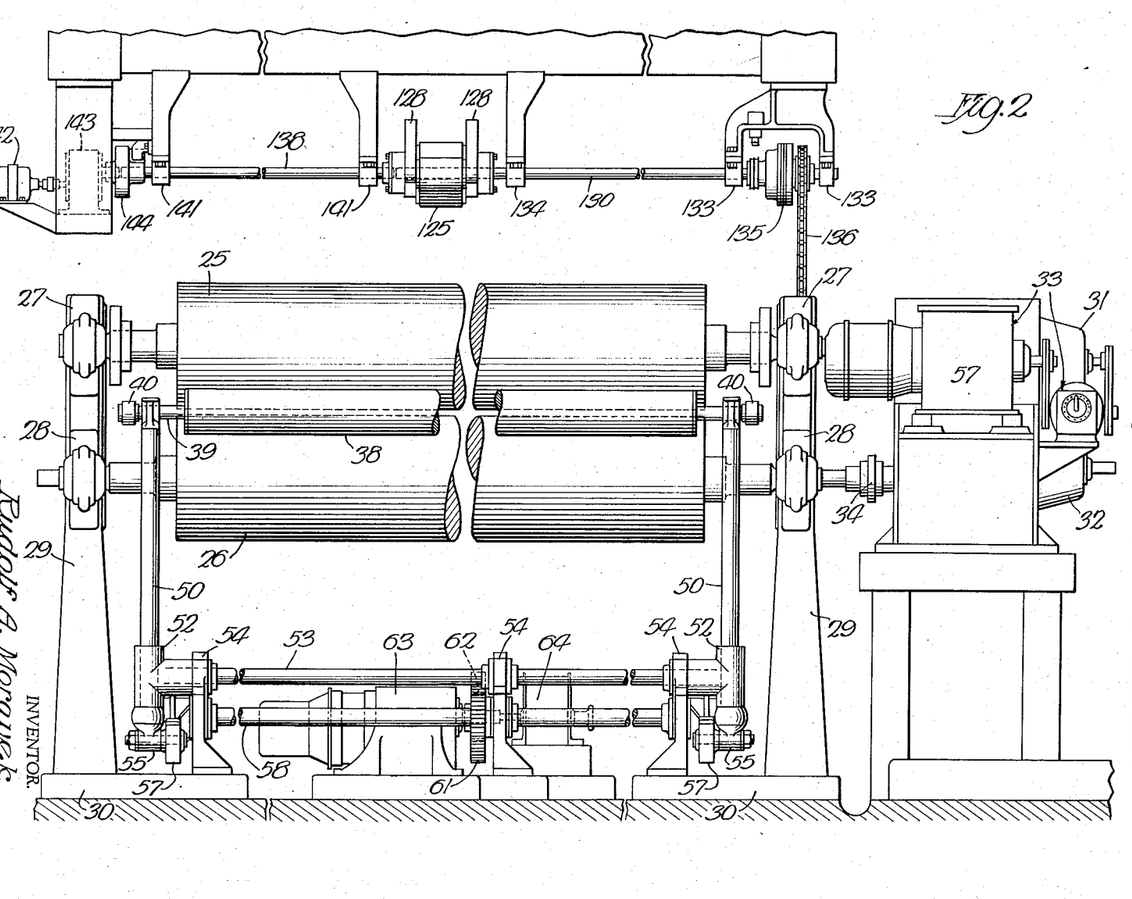
Fig. 2 is an end elevation on the line 2, 2 of Fig. 1 but showing certain parts in a changed position.

The mechanism for automatically carrying an empty core shaft from the tracks 35 and 36 to the web-reeling position shown in Fig. 3 comprises a pair of arms or posts 50 which have their outer or free ends provided with a recessed seat indicated at 51 for receiving a portion of the shaft 39. Said posts or arms 50 (see also Fig. 2) are each slidably mounted in a sleevelike member 52 which is carried by the adjacent end of a shaft 53. The sleeves 52 are fixedly secured to the respective ends of the shaft 53 and the latter is mounted for rotary movement in suitable bearing brackets 54 which extend upwardly from the bedplate of the apparatus.

Each post 50 extends through its sleeve 52 and has its other end provided with a suitable fitting through which it is pivotally connected as shown at 55 to a block 56 which is slidably mounted in a crank arm 57. Each crank arm 57 is secured at one end to a transversely extending shaft 58 which is also suitably journaled in bearings provided in the bracket members 54. Coil springs such as indicated at 59 interpose between the slide blocks 56 and portions of the respective arms 57 serve to normally urge the slide block 56 to move to the outer ends of the respective arms where it is retained by a suitable end member such as indicated at 60.

Figure 1:
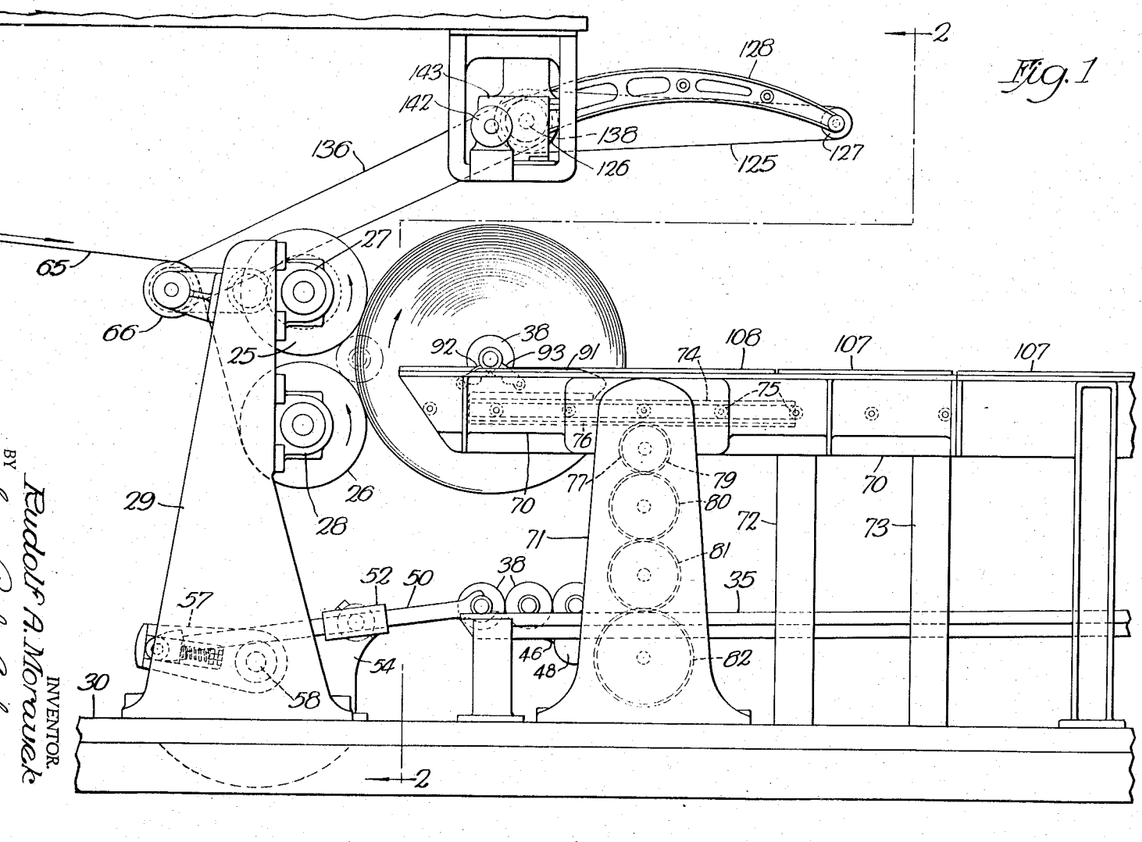
Fig. 1 is a side elevation.

It will be seen that if the shaft 58 with its arms 57 are rocked clockwise from the position shown in Fig. 3 to the position shown in Fig. 1, the core shaft carrying posts 50 will be rocked about the axis of the shaft 53 and will also be lowered or retracted by sliding through the sleeves 52. Similarly when the crank arm 57 is in the position shown in Fig. 1, counterclockwise rotation thereof will move the posts 50 from the generally horizontal and generally retracted position shown to the substantially vertical and elevated position shown in Fig. 3.

The shaft 58 has secured to it a gear 61 which meshes with a gear 62 carried by the driven shaft of a reversible electric motor 63. Said motor has operatively connected to it a suitable limit switch mechanism indicated generally at 64 which serves at the proper time to break the circuit to the motor so as to stop its operation at either limit of movement of the arms 57.

When the posts 50 are in their lowered position as shown in Figs. 1 and 12, the core retaining latch arms 46 are lowered so as to permit a core to roll into the seats 51 as clearly shown in Fig. 12. The disengaging of the latch arms 46 results from engagement of the free end portions of the posts 50 with the pins 49 of the respective latch arms 46. As soon as the respective posts 50 are moved upwardly to carry a core shaft upwardly therewith, the respective latch arms are automatically restored to their operative positions by their respective counterweights so that the next core shaft 38 will be engaged and prevented from rolling off the tracks 35 and 36.

A web of paper or other material indicated at 65, being delivered from the drying cylinder of a paper machine or from any other source, is guided over a guide roller 66 suitably journaled in brackets carried by the upstanding frame members 29, thence downwardly under the lowermost drum 26 and upwardly around the same to the core shaft 38 then positioned in the bight of the drums 25 and 26. The paper web is directed around the core shaft 38 which is rotated incident to its surface contact with the driven drums 25 and 26. As the web winds up on the core shaft 38, the diameter of the roll gradually increases and necessitates movement of the core shaft away from the surface of the rolls 25 and 26. Such movement is permitted while the core shaft remains seated in the upper ends of the posts 50 incident to the capacity of the posts 50 to rock in a clockwise direction about the axis of the shaft and against the pressure of the springs 59.

In order that the web be wound with uniform tension on the core shaft notwithstanding gradual increase in the diameter of the reel during its formation, means is provided for exerting a uniform and controlled force on the core shaft to maintain the surface of the reel thereon in constant contact with the drums 25 and 26. Such means is best shown in Figs. 3 to 13 inclusive.

By reference to Figs. 3 to 13 inclusive, it will be seen that there are provided a pair of horizontally extending U-shaped members 70 supported by suitable uprights 71, 72 and 73. Within each of said U-shaped members 70 there is horizontally slidably mounted a pusher arm 74. Each pusher arm is guided by rollers such as indicated at 75 carried by the opposite sides of the U-shaped members 70 and fitting within channels within the opposite sides of the member 74. Each pusher member 74 has secured to its bottom side a rack 76 which meshes with a gear 77 suitably journaled in an extension of the supporting member 71. Each gear 77 is carried by a shaft 78 which has secured to its other end a gear 79. The gear 79 comprises one of a train of gears including in addition to the gear 79 the gears 80 and 81 which are suitably rotatably supported by the upright member 71 and a gear 82 which is secured to a motor-driven shaft 83 also suitably journaled in the supporting member 71 (see Fig. 6). The shaft 83 for each gear 82 is in effect part of a continuous shaft, the gear carrying sections of which are rigidly interconnected by means of a hollow shaft or quill 84. The shaft 83 at one side of the apparatus is connected through the agency of a flexible coupling 85 to an electric motor 86 which is preferably of the type designed for the output of a substantially constant torque and which may be varied if desired by means of a variable rheostat incorporated in the electrical circuit to the motor. The driven shaft 83 also carries a gear 87 which meshes with a gear 88 carried by a shaft 89 of a rotary switch unit indicated in its entirety at 90 and which may include as many switches or switch actuating devices as desired for the control of the apparatus.

It will be seen that the electric motor 86 is operative through the respective gear trains and the gears 77 and racks 76 to effect movement of the pusher members 74 toward the winding drums 25 and 26.

The front end of each pusher member 74 has secured to it a horizontally elongated upwardly facing channel bar 91. At the forward end of the channel bar 91 there is pivoted a pair of fingers 92 and 93 respectively, the finger 92 being extended rearwardly from the front end of the member 91 to which it is pivoted as indicated at 94 and the finger 93 extending forwardly from its pivot connection 95 with the member 91. The adjacent or free ends of the fingers 92 and 93 are suitably formed as shown to cooperate to form a segmental seat for engaging and holding the bearing housing 40 at the adjacent end of a core shaft 38. Vertical rocking movement of the fingers 92 and 93 is limited by means such as pins 96 and 97 extending from the respective fingers into openings such as shown at 98 and 99 respectively in one side of the member 91. The fingers are normally urged to move to their upward limit of movement by suitable spring actuated rods 100 and 101 which are vertically slidably mounted in suitable openings provided in the pusher bar 74.

Figure 13:
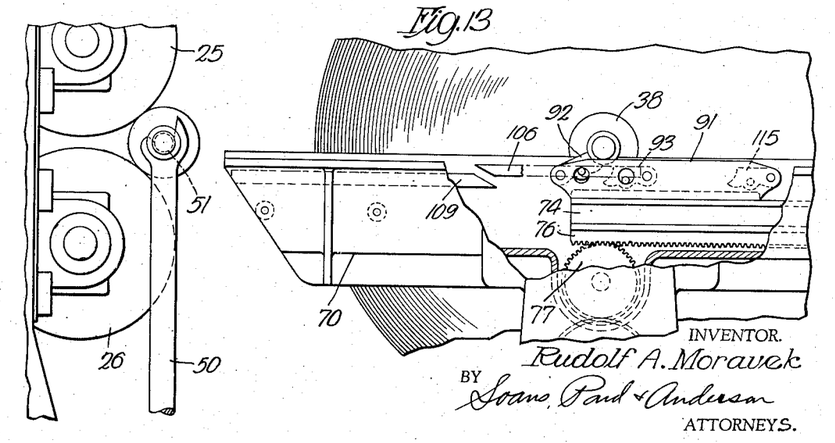

When a core shaft is initially delivered to the bight of the drums 25 and 26 to start a new reel as shown in Fig. 3, the pusher bars 74 are moving away from the rolls 25 and 26 to carry away a completed reel. When the pusher bars reach a predetermined, full retracted position, approximately as indicated in Fig. 13, a switch in the switch assembly 90 will be closed to reverse the direction of rotation of the motor 86 and to cause the pusher arms 74 to move forwardly or toward the drums 25 and 26. When the finger 92 engages the bearing housing 40 of the newly positioned roll core, said finger will be depressed against the pressure of its spring actuated rod 100 and will ride under the bearing housing until it reaches a position wherein the spring plunger may lift the finger into the relative position illustrated in Fig. 8 wherein it cooperates with the finger 93 to effectively hold the newly positioned core shaft. The torque motor 86 serves, of course, to exert a constant driving force which tends to move the pusher arms 74 forwardly but such movement is limited by engagement of the core shaft 38 with the drums 25 and 26. Incident to the gradually increasing diameter of the reel being formed on the core shaft 38 the pusher members 74 will of course be moved rearwardly against the torque pressure of the motor 86 which, being substantially constant, results in the holding of the reel being formed on the core shaft 38 against the drums 25 and 26 with constant surface pressure. Hence, the reel being formed will be wound with a constant and uniform tension from beginning to end of the web in the reel.

It will be observed that incident to the movement of the core shaft away from the drums 25 and 26, the core elevating members 50 will be slowly rocked in a clockwise direction about the axis of the shaft 53 and that ultimately the core shaft will be wholly disengaged from the seat 51 in the end of each arm 50.

By means of a suitable cam actuated switch embodied in the switch unit 90 and controlled by the shaft 83, the motor 63 may be energized shortly after the core shaft is freed from the seats in the arms 50 as above explained, to thereby continue the clockwise movement of the arms until they reach their fully lowered position as shown in Figs. 1 and 12. The clockwise rocking movement of the arms 50 may be automatically terminated when they reach their lowered position by means of a suitable limit switch included in the switch unit 64 which is controlled by the operating motor 63. It will of course be evident that the arms 50 may be returned to their lowered position so as to receive a new or empty core shaft before the completion of a reel on the core shaft previously delivered to the bight of the drums 25 and 26.

When the reel is built up to the desired size, a switch or switches in the limit switch 90 will be actuated to reverse the direction of rotation of the motor 86 whereby the pushers 74 with the completed reel carried by their front ends will be conveyed rearwardly or away from the drums 25 and 26.

The completed reel will be released from the holding fingers 92 and 93 during the course of the travel of the completed reel. For that purpose the pin 97 of the finger 93 is extended so as to project under the outer face of the member 91 (see Fig. 10) so as to be capable of engaging a downwardly inclined cam 105 (see Figs. 3, 5 and 12). Said cam 105 is formed on the end of an elongated bar 106 which is secured to the adjacent side of the U-shaped supporting member 70 and it serves to cam the pin 97 and its finger 93 downwardly to release the core shaft for movement over the finger. During continued rearward movement of the pusher bars 74 and the fingers 92 and 93, the finger 93 will be held in its downwardly adjusting position by engagement of the pin 97 with the lower edge of the cam bar 106.

It will of course be apparent that the momentum of the completed reel will effect its continued rearward movement, even after the pusher bars 74 and fingers 92 come to rest. The completed reel is delivered, incident to its travel by momentum to relatively stationary guide tracks such as indicated at 107 which serve to guide the completed reel to other apparatus for handling the reel as may be desired.

As shown in Figs. 6 and 7, the U-shaped supporting members 70 are provided on the upper edges of their inner sides with rail members 108 which constitute, in effect, forward extensions of the tracks 107 to initially receive the completed reels from the pusher bar fingers 92 and 93.

During the reeling of the web on the core shaft, the fingers 92 and 93 are locked in their operative elevated position by engagement of the extended ends of their pins 96 and 97 with the upper edges of cam bars 109 (see Figs. 3, 5 and 12). Said bars 109, like the cam bars 106, are secured to the U-shaped support member 70 (see Fig. 6) and their rear ends are shaped to provide upwardly and forwardly inclined cam ends 110 which serve to engage the pins 97 of the fingers 93 to return the same to their operative position, as clearly shown in Fig. 12.

During the time that a completed reel is being carried away by the pusher bars 74, the core elevating arms 50 are actuated to deliver an empty core shaft to the drums 25 and 26. The core elevator arms 50 are set in motion by the operation of a suitable switch or switches embodied in the switch unit 90 and controlled by the shaft 83. The sequence of steps in the operation of the apparatus is shown in Figs. 17 to 20 inclusive. By inspection of said figures, it will be seen that incident to the delivery of a new or empty core shaft to the drums 25 and 26, the new core shaft 38 will engage the web extending between the lowermost drum 26 and the completed reel which is at that time being carried away from the drums 25 and 26 (see Fig. 18). When the new core shaft 38 reaches the position shown in dotted lines in Fig. 18 and the web 65 has been gripped between the new core shaft and the drums 25 and 26 and extends between the new core shaft and the completed reel, it is either manually or automatically severed between the new core shaft and the completed reel so as to free the completed reel from the webbing being then delivered to the newly positioned core shaft 38. The web 65 continues to be reeled on the newly delivered core shaft until it reaches the predetermined size of a completed reel whereupon the described operations are again automatically repeated.

The apparatus as described with some additional mechanism about to be described may be employed for reeling two plies of webbing on a core shaft so as to form a reel of two-ply webbing.

For the last indicated purpose there is provided on the pusher arms 74 additional forwardly facing fingers 115 pivoted at their rear ends as indicated at 116 to the members 91 and provided intermediate their ends with laterally extending pins 117. The pins 117 are adapted to engage inclined cam ends 118, 119, 120 and 121 (see Fig. 4) formed on cam bars 122, 123 and 124 which are secured to one side of the U-shaped frame members 70 as best shown in Fig. 6. The pins 117 extend through enlarged openings such as indicated at 118 in the respective sides of the member 91 so as to thereby limit the extent of pivotal movement of the fingers 115.

Above the described apparatus there is also mounted a belt arrangement for engaging a reel to effect reversal of its direction of rotation. Such belt arrangement as herein shown comprises a suitable flexible belt 125 which extends around belt pulleys 126 and 127. The pulley 127 is suitably journaled in the free ends of a pair of arms 128 which are pivotally supported on a shaft 130 on which the pulley 126 is secured. The arms 128 are pivotally mounted on the shaft 130 through the agency of suitable anti-friction bearings as shown at 131, so as to permit free rocking of the arms about said shaft 130. The arms 128 and endless belt structure carried thereby are counterbalanced by means of a counterweight 132 suitably connected to the pivotally mounted ends or hubs of the arms 128 and extending oppositely to the arms 128. The shaft 130 which carries the belt pulley 126 is journaled in suitable bearings 133 and 134 (see Figs. 2 and 14) and is adapted to be driven through the agency of a magnetic or other suitable clutch indicated at 135, by means of a chain connection to any conveniently accessible driven shaft or roll of the described reeling apparatus or paper mill with which the apparatus is associated. As shown in Fig. 1 the drive chain 136 extends between a sprocket on the shaft 130 and a sprocket carried by the shaft of the guide roll 66 which may be assumed to be power-driven in any suitable manner not herein shown.

The pulley shaft 130 terminates as shown at 137 and another shaft 138 co-axially disposed relative to the shaft 130 extends endwise from the outside of the hub 139 of the adjacent arm 128. The shaft 138 is secured to the hub 139 so that rotary movement of the shaft will be imparted to the arms 128, the same being interconnected adjacent their free ends by the shaft of the pulley 127 and at other suitable intervals by tie rods 140. The shaft 138 is supported in a pair of suitable bearings 141. The shaft 138 is rotated by means of a reversible electric motor 142 which is connected through the agency of a speed reducing unit 143 and a coupling device 144. Said coupling device 144 comprises a member 145 secured to the output shaft 146 of the speed reducing unit 143 and a member 147 which is secured to the shaft 138.

The coupling member 145 embodies a pair of inwardly extending lugs 148 and 149, the lug 148 being disposed adjacent the periphery of the member 145 and the lug 149 being disposed adjacent the center of said member. The coupling member 147 is provided with a laterally extending lug 150 adjacent its periphery and with a lug 151 adjacent the center thereof. When the motor 142 is driven in one direction, the lugs 148 and 149 are respectively adapted to engage the lugs 150 and 151 to thereby transmit rotary movement from the coupling member 145 to the coupling member 147 and the shaft 138.

A pair of limit switches 152 and 153 suitably connected to the electric motor 142 are provided for controlling the rotation of the shaft 138 and swinging of the belt 125. The switch 152 is adapted to be actuated in properly timed relation by a cam member 154 adjustably mounted on the face of the coupling member 145 and the switch 153 may be actuated by a cam 155 mounted on the periphery of said coupling member 145.

Figure 17:
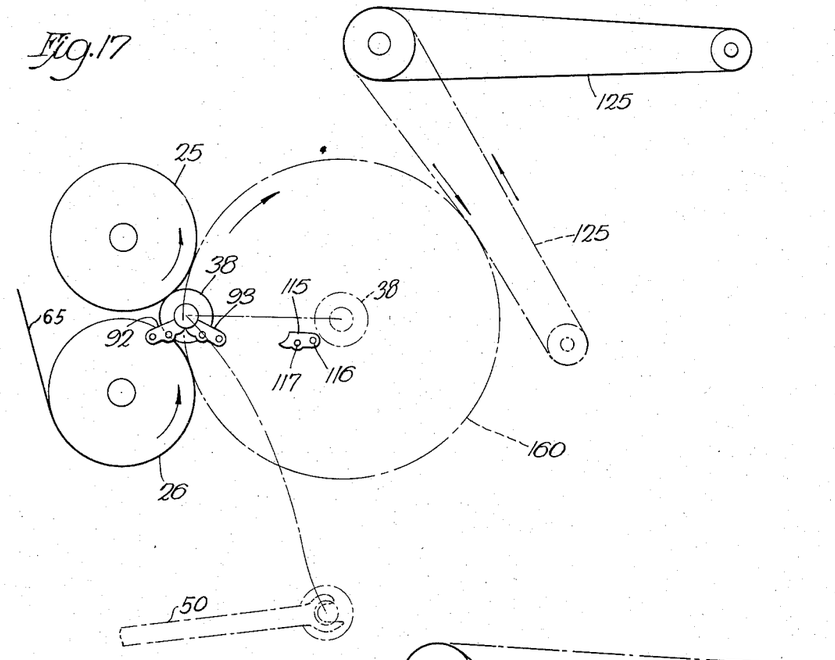
Figs. 17, 18, 19 and 20 are diagrammatic illustrations of the method of operation of the improved apparatus for reeling a two-ply roll.
Figure 18:
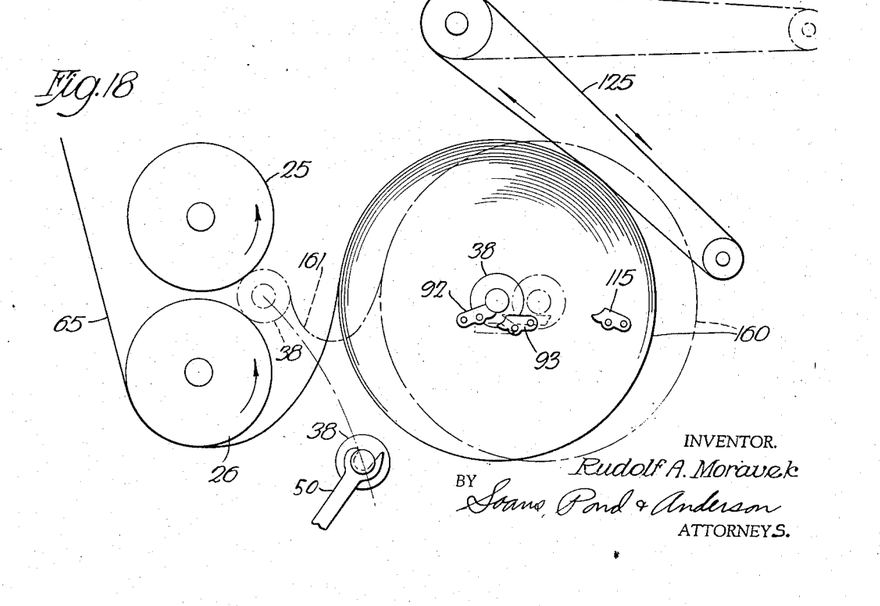

For reeling the paper web 65 into a two-ply reel, the paper web is initially reeled on a core shaft to provide on such core shaft the length of web required for one of the plies of the desired two-ply reel. In other words, a single ply half-reel is formed on a core shaft. In Fig. 17, it may be assumed that the broken line circle 160 represents the periphery of a half-reel. When the reel has reached its desired size, a suitably set switch in the switch unit 90, or a switch controlled by a rotation counter (counting the turns of the reel or other related part) and relays, is actuated to reverse the motor 86, thereby to start movement of the half-reel away from the drums 25 and 26 substantially as occurs in the normal reeling of full single-ply reels as already explained. Another switch in the switch unit 90, (or any other suitably actuated automatic switch) is actuated to energize the motor 142 to rotate the same in the proper direction for lowering the belt 125 from the full line position indicated in Fig. 17, to the broken line position, as shown in said figure. When the belt is lowered as explained, the belt itself is not driven but is free to be driven incident to its contact with the then clockwise rotating reel 160.

Figures 14, 15, 16:
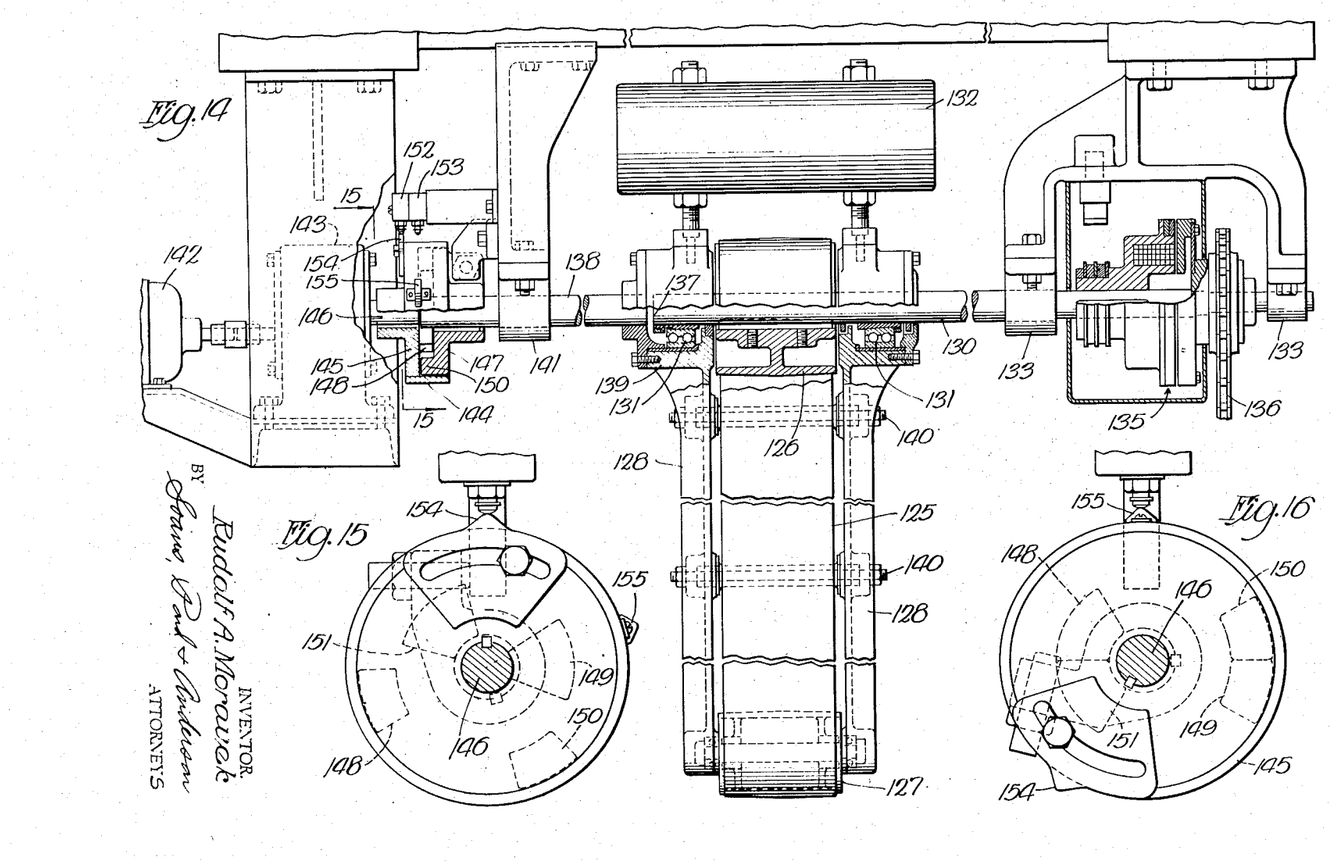
Fig. 14 is an end elevation of part of the mechanism shown also in Figs. 1 and 2 but on an enlarged scale and in a changed position.
Fig. 15 is a section on the line 15, 15 of Fig. 14.
Fig. 16 is a section corresponding to Fig. 15 but showing a changed position of the parts.

The lowering of the belt 125 into engagement with the reel 160 is effected by clockwise rotation of the coupling parts shown in Figs. 15 and 16. At the start of the lowering operation the parts are in substantially the position shown in Fig. 16. It will be seen that clockwise rotation imparted to the coupling member 145 and its lugs 148 and 149 will not drive but will merely permit the lugs 150 and 151 of the coupling member 147 to follow the said clockwise rotation incident to the normal tendency of the belt 125 to gravitate in a clockwise direction from its horizontal position. It should of course be understood that the counterbalancing weight 132 is so adjusted that the belt 125 and its supporting arms 128 will overbalance the counterweight sufficiently to cause the belt to gravitate in the manner set forth with sufficient force to insure the establishment of driving engagement between the belt and the reel. It will also be observed that the belt 125 is of such free-running character that the rotation of the reel 160 will readily effect corresponding travel of the belt 125 without causing injury to the reel.

The clockwise rotation of the coupling part 145 need not necessarily terminate at the moment the belt 125 engages the reel, since the lugs 148 and 149 of said coupling part may continue their clockwise movement and become separated from the lugs 150 and 151 of the coupling member 147 which come to a stop when the belt engages the reel. However, the clockwise rotation of the coupling member 145 is automatically terminated at a suitable point by actuation of the limit switch 152 by the cam 154.

When the reel 160 has been carried by the pusher bars 74 and the fingers 92 and 93 to the limit of outward or rearward movement of the pusher bars, another switch in the switch unit 90 is operated to energize the magnetic clutch 135 so as to effect reversal of the direction of travel of the belt 125 and to thereby reverse the direction of rotation of the reel 160. The employment of a magnetic clutch for this purpose results in a gradual stopping of the initial clockwise rotation of the reel 160 and reversal of said direction of rotation so as to further protect the reel against injury incident to such reversal of rotation.

Figure 19:
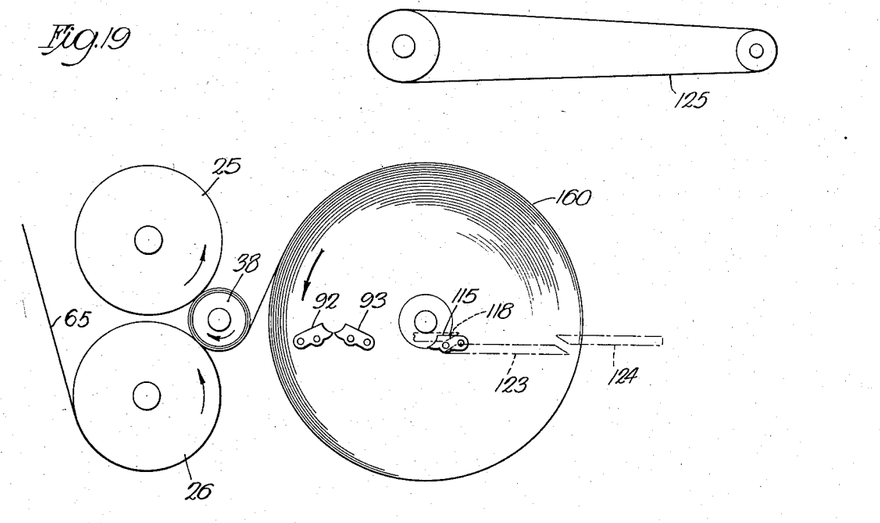

During the time that the half-reel 160 is separated from the drums 25 and 26, a new or empty core shaft 38 is delivered by the mechanism, already explained, to the bight of the drums 25 and 26. In this instance the web 65 need not be severed between the new core shaft 38 and reel 160 but the web portion indicated at 161 is permitted to follow the surface of the newly placed core shaft 138 and to pass between such core shaft and the drums 25 and 26 whereby the web 65 is fed to the newly placed core shaft from both the original source of the webbing and from the half reel 160, the relationship then being substantially as indicated in Fig. 19.

The half reel 160 is desirably returned toward the drums 25 and 26 to the extent permitted by the presence of the intervening newly placed core shaft 38. For this purpose the finger 115 is maintained in an upwardly adjusted position by the cam bar 123 so that during the desired portion of the forward movement of the pusher bar said finger will engage the shaft of the half-reel 160 to move such reel toward the drums 25 and 26. As shown in Fig. 19, the finger 115 is automatically lowered by the cam 118 so as to permit said finger to pass under the core shaft of the reel 160 when the reel closely approaches its fully returned position, so as to thereby permit the pusher bars 74 and the fingers 92 and 93 to continue their forward movement until the fingers 92 and 93 come into operative relation to the shaft of the newly placed core shaft 38. The momentum of the reel 160 will complete the movement of the reel into engagement with the surface of the newly placed core shaft or with the surface of the reel being formed thereon so that the rotation of the now forming two ply reel will be communicated to the half-reel 160 so as to continue the counterclockwise rotation thereof as required for transferring the web from such reel to the two-ply reel.

Figure 20:
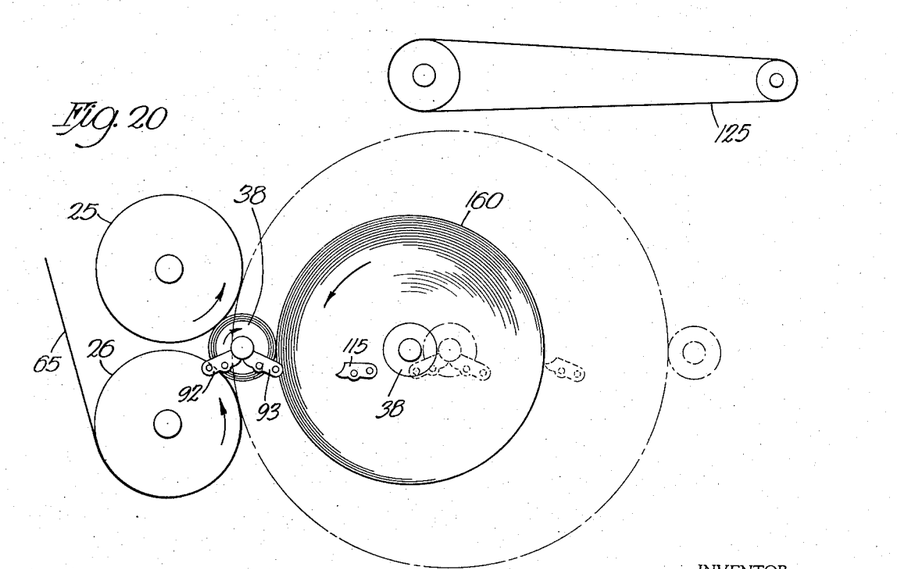

The reel reversing belt 125 may be automatically returned to its elevating position at any point during the travel of the reel 160 back to its feeding position as shown in Fig. 20. Such return movement of the belt 125 may be controlled by a switch embodied in the switch unit 90 which will energize the motor 142 to rotate the same in the proper direction for driving the coupling members 145 and 147 in a counterclockwise direction as viewed in Figs. 15 and 16.

Upon counter-clockwise rotation of the coupling member 145, its lugs 148 and 149 engage the lugs 150 and 151 respectively of the coupling member 147 to thereby transmit counter-clockwise rotation to the shaft 138 and consequently lifting movement to the belt 125. The upward movement of the belt 125 is automatically stopped by the cooperation of the cam 155 and limit switch 153 as already mentioned.

When the two-ply reel is built up to the desired size, it is handled in the same way that a singleply reel is handled to separate it from the incoming web 65 and to start the reeling of a new half-reel.

It may be observed that in the formation of two ply reels, one set of switches is required for controlling the operation of the mechanism during the manipulation of the half-reel and the reversing belt 125 and that other switches may be provided for operating the mechanism upon completion of the two ply reel. Such separate sets of switches are of course to be operated alternately. Such alternate operation may be provided for in many ways well known to those skilled in the electrical arts and inasmuch as the details of such switches form no part of the present invention, they are not herein disclosed or described.

*Electrical circuits and operation single ply reeling*

When forming single ply reels, the operation is substantially as follows:

*Step 1.*—When first starting operation, a switch A is manually closed to elevate a reel core into operative relation to the winding drums. The switch A closes a circuit to an electrical element B, which operates to close a gang switch C in the circuit of the reversible core elevating motor 63. The switch C remains closed until subsequent operations effect opening thereof and it is so wired to the motor 63 as to cause the same to rotate in the proper direction for swinging the core elevating arms 50 upwardly. The manually operated switch A may be released as soon as the switch C is closed, but a switch A' associated with the switch C opens to break the circuit to the electrical device B when the switch C closes.

*Step 2.*—When a new reel core is delivered to operative position, a switch D in the control unit 64 associated with and driven by the motor 63 is actuated to close a circuit to an electrical device E, which opens the switch C to stop the motor 63, leaving the core elevating arms 50 in up position. The circuit to the device E is also controlled by a switch D' which is associated with and opens with the switch C.

*Step 3.*—A torque motor 86 is next started so as to advance the pushers 74 to hold the reel core against the winding drums. The motor 86 is started by closing the main switch F, gang switch G being assumed to be closed in the condition in which work was stopped at the close of the previous operation of the apparatus.

*Step 4.*—After the reel is built up sufficiently to have caused the pushers 74 to move outwardly (away from the winding drums 25 and 26) to such an extent that the reel core has become disengaged from the elevator arms 50, a switch H in the unit 90 is closed to energize a coil J which acts to close a gang switch K, thereby to run the motor 63 reversely so as to lower the arms 50. The switch K remains closed until subsequent operations effect opening thereof. The circuit of the switch H and coil J is also controlled by a switch H', which is associated with the switch K and which switch H' opens when the switch K closes, and vice versa.

*Step 5.*—When the arms 50 reach their lower limit of movement, a switch L in the unit 64 closes a circuit to a coil M, which opens the switch K to stop the motor 63. The circuit of switch L and coil M is also controlled by a switch L' which opens and closes with the switch K.

*Step 6.*—When the pushers 74 are forced outwardly to a position determined by the size of the desired reel, a switch N in the unit 90 is closed to energize coils P and Q for opening gang switch G and closing gang switch R respectively, thereby to reverse the motor 86 and retract the pushers 74 and the completed reel.

*Step 7.*—During the retraction of the pushers 74, a new reel core is being elevated to reeling position. This is automatically effected by the closing of a switch S in the unit 90, whereby winding B is energized to close switch C to run motor 63 to elevate the reel core. The switch D in the unit 64 is closed, as above explained, to stop the motor 63 when the new reel core reaches operative position.

*Step 8.*—When the pushers 74 reach their outward limit of travel (somewhat after the full reel has been discharged from the pusher arms), a switch T in unit 90 is closed to energize windings U and V which respectively open switch R and close switch G to again reverse the motor 86 and to advance the pushers 74 to operative position.

*Step 9.*—The cycle of operations is then continuous and automatically repeated as set forth in foregoing paragraphs 4 to 8 inclusive.

The cams which operate the switches H, S, N and T in control unit 90 are so arranged that they operate the switches only on forward movement of the cams incident to outward movement of the pushers 74. Various arrangements may be used to procure such one-way operation, for example a spring pawl device which is operative when rotation is in one direction but inoperative or yielding when rotation is in the opposite direction. It should be observed that there is a definite relationship between the position of the pusher arms 74 and the various cams of the unit 90 due to the interconnecting gearing comprising the gears 79, 80, 81, 82 and shaft 83, gears 87 and 88, and the shaft 89 (see Figure 6 of the drawings).

*Two-ply reeling*

For reeling two-ply rolls, the foregoing operations are employed together with certain additional operations which are also controlled by switches embodied in the control unit 90. For two-ply reeling, a switch 306 is manually closed, and steps 1 to 5 as above outlined take place in the order indicated. Then the following steps occur:

*Step 6A.*—A switch W in the unit 90 is closed when the reel contains the required length of material, i. e., usually one-half a single ply reel. Closing of the switch W operates to energize coils P and Q to thereby reverse the motor 86 to retract the half reel.

*Step 7A.*—During the retraction of the half reel, a switch X in the unit 90 is closed to energize coil Y, which closes switch 300 to operate the motor 142 in the proper direction for lowering the belt 125 into engagement with the retracted half reel.

*Step 8A.*—Downward movement of the belt 125 is stopped by means of the cam 154, which closes switch 152 to complete a circuit to a winding 302 for opening the switch 300.

*Step 9A.*—Also during the retraction of the half reel, a new reel core is elevated to reeling position, this being initiated by closing of the switch S in the unit 90, as explained in paragraph 7.

*Step 10A.*—When the retraction of the half reel is completed, or nearly so, a switch 303 in control unit 90 is closed to energize the magnetic clutch 135 so as to drive the belt to reverse the rotation of the half reel. The switch 303 may be held closed by its operating cam for the time required for effecting reversal of the half reel, after which the switch 303 is again opened and the clutch 135 de-energized. As a practical matter, the switch 303 may be held closed during a final portion of the outward movement of the pushers 74 and during an initial portion of the return or advancing movement of the pushers.

*Step 11A.*—At the limit of retraction of the pushers 74, the switch T in the unit 90 is closed to energize windings U and V to reverse the torque motor 86 and again advance the pushers 74 to operative position relative to the newly delivered reel core.

*Step 12A.*—When the new two-ply reel is built up to full size, the switch N in the unit 90 will be closed to reverse the torque motor 86 to retract the full two-ply reel as explained for a single ply reel in paragraph 6.

*Step 13A.*—It will be observed that in the two-ply reeling operation the belt 125 is brought into operation and a reel core delivered each time that a half reel is formed as an intermediate step in the production of a full two-ply reel. Hence the cams which operate the switches W, X, 303 and 307 in the control unit 90 should be operative only every other time that the pushers 74 are moved outwardly and returned to operative position relative to the winding drums. Such operation of the switches W, X, 303 and 307 intermediate every other cycle of operation of the switches H, S, N and T may be obtained by driving the operating cams for the switches W, X, 303 and 307 only forwardly and only one-half a revolution for each full revolution of the cams which operate the other switches in the unit 90. This may be accomplished by appropriate gearing and a one-way driving clutch arrangement indicated generally at 304 in the diagram.

*Step 14A.*—The belt 125 is returned to its elevated, inoperative position after reversal of the rotation of the half reel and during the return of the half reel to advanced position for delivering its web to the new, two-ply reel to be formed. Such return of the belt 125 may be initiated by the switch 307 in the unit 90 which may be closed, at the beginning of the outward movement of the pushers, to energize a winding 308 which closes the switch 301 to actuate the motor 142 in the proper direction to elevate the belt. Return movement of the belt 125 is limited or stopped by closing of the switch 153 by means of the cam 155, thereby energizing a winding 309 which opens the switch 301.

In the operation of the described reeling apparatus, whether used for reeling single ply or two ply reels, the gradually increasing diameter of the reel being formed has no bearing on the contact pressure between the reel and the drums 25 and 26. The weight of the reel supplies no component of the force which holds the reel in contact with the drums 25 and 26, such force being wholly dependent upon the controllable torque of the electric motor 86. This is of considerable importance in the production of uniformly wound reels.

Another important advantage of the described construction is that the position of the core shaft of the reel is definitely determined by the pusher bars 74 and their fingers 92 and 93 so that the core shaft may be accurately positioned in parallel position to the drums 25 and 26 to thereby further insure the production of a cylindrical reel rather than a cone-shaped reel which might occur in conventional apparatus where the position of the core shaft is neither accurately nor positively controlled.

The tautness of the winding of the reel is controllable in the described mechanism incident to the controllability of the speed of rotation or torque of the drums 25 and 26. If the upper drum 25 is driven with a greater torque than the lower drum, there will, of course, be an increase in the tautness with which the web is wound on the reel. By the same token, if the torque of the upper drum 25 is made less than that of the lower drum, the web will be loose-wound in the reel.

The principles of the winding structure described may advantageously be employed also for effecting unwinding where a paper web is to be drawn from a supply reel and acted upon by other mechanism for converting the web into a given product. It would be apparent that by holding a reel against the drums 25 and 26, the reel may be driven in such direction as to unwind the web therefrom for the purpose of feeding it to other apparatus, the unwinding operation being then performed in such a manner that the web is fed at a substantially constant speed and at a uniform tautness.

By the described arrangement, the reel, whether being wound or unwound, is effectively held against the driving drums 25 and 26 with the axis of the reel positively maintained in parallel relation to the axes of the drums 25 and 26, whereby a uniform and straight reel is readily produced or, in unwinding operations, a uniform and straight unwound sheet or web delivered.

In the case of an unwinding operation, it may, in some instances, be desirable that the reel be held against the driving drums with an initially high pressure which is gradually reduced as the size and weight of the reel become less. Such variation in the pressure may be effected by either manually or automatically controlling and regulating the torque of the torque motor 86.

Instead of a torque motor, a counterbalancing arrangement may be provided for controlling the pressure with which the reel is held against the driving drums. Particularly for unwinding operations, where the pressure is desirably reduced as the reel size and weight are reduced, a counterbalancing weight arrangement may be desired, in which case the effect of the counterbalancing weight may be controlled by employing a suitable spiral pulley or equivalent arrangement whereby the lever arm through which the force of the weight is transmitted may be gradually altered to suit.

Changes in the described structure may be made without departing from the spirit of the invention, the scope of which should be determined by reference to the following claims, the same being construed as broadly as possible consistent with the state of the art.

I claim:

1. In apparatus of the class described, a rotatably driven drum, means for conveying a reel core upwardly into engagement with said drum, reel core supporting means horizontally movable from an initially spaced position relative to said drum to operative position under a portion of said core, said horizontally movable means being also movable from said drum as an incident to the building up of a roll supported on said horizontally movable means, and reversible means operative in one direction of movement to urge said horizontally movable means to move with a constant force toward said drum and in the opposite direction to move said horizontally movable means from said drum to thereby carry said reel core and reel formed thereon from the drum.

2. In apparatus of the class described a pair of rotatably driven drums, means for conveying a reel core into reel forming relation to both of said drums, reversible power driven means operative in one direction to urge said core toward said drums with a constant pressure while, at the same time, permitting movement of said core from said drums incident to the reeling of a web on the core, said power driven means being operable in the opposite direction to carry said core and reel formed thereon from said drums, and means for driving said drums including a variable torque drive for at least one of said drums whereby to control the tautness of the web wound on said core.

3. In apparatus of the class described, the combination of a pair of rotatably driven drums, means for supporting an empty reel core below said drums, means for elevating a reel core from said supporting means into the bight of said drums, horizontally movably supported means for supporting said reel core in the bight of said drums, said means being movable toward and from said drums and operative to receive said reel core from said elevating and positioning means, and means for applying substantially constant force to said horizontally movable means to urge the same toward said drums, while at the same time permitting movement thereof from said drums.

4. In apparatus of the class described, a rotatably driven drum, means for supporting a reel core below said drum, means for elevating a reel core from said supporting means into reel-forming relation to said drum, said elevating means comprising a sleeve member mounted for rocking movement on an axis extending transversely of the direction of the sleeve, a post slidable in said sleeve and provided at one end with means for engaging the reel core on said supporting means, and a crank arm having its free end pivotally connected to the other end of said post and operative, as an incident to rocking of said crank arm to rock said post about the pivot of said sleeve and to slide said post upwardly through said sleeve.

5. In apparatus of the class described, a rotatably driven drum, means for supporting a reel core below said drum, means for elevating a reel core from said supporting means into reel-forming relation to said drum, said elevating means comprising a sleeve member mounted for rocking movement on an axis extending transversely of the direction of the sleeve, a post slidable in said sleeve and provided at one end with means for engaging the reel core on said supporting means, and a crank arm having its free end pivotally connected to the other end of said post and operative, as an incident to rocking of said crank arm, to rock said post about the pivot of said sleeve and to slide said post upwardly through said sleeve, the pivotal connection between said post and crank arm comprising a crank pin mounted in said crank arm for movement toward and from the axis of rotation of the crank arm, and yieldable means for normally maintaining said crank pin in outwardly disposed position and operative to permit inward movement of said crank pin as an incident to outward movement of the reel-positioning end of said post as an incident to the gradually increasing diameter of a reel formed on said core.

6. Apparatus of the class described comprising a horizontally movable reel supporting member, means for elevating a reel core from below said supporting member to an elevated position relative thereto, a pair of respectively opposed, cooperating fingers pivotally mounted on said horizontally movable supporting member and provided with adjacent ends projecting upwardly from said supporting member and adapted to receive and hold a reel core between them on said supporting member, means for normally urging said fingers to their operative elevated position, means for locking said fingers in said elevated position during predetermined portions of the horizontal movement of said supporting member, and cam means for effecting lowering of one of said fingers to permit discharge of a reel from said fingers, the other of said fingers being depressible as an incident to engagement thereby with a reel core supported by said elevating means when said supporting member is moved horizontally under such reel.

7. Apparatus of the class described comprising a rotatably driven drum for guiding a web, means for elevating a reel core from below said drum to reel-forming relation thereto, laterally movable means for receiving said reel core from said elevating means and supporting said core during the reeling thereon of web guided by said drum, means operative when the reel has reached a predetermined size to effect movement of said laterally movable supporting means and the reel supported thereby from said drum, means for reversing the direction of rotation of said reel, means for operating said core elevating means to carry another core into engagement with the web passing from said drum to said reel and to carry the engaged web portion against said drum so as to start the reeling of the web from both said drum and reel on said last mentioned core, and means for returning said reel supporting means toward said drum to effect inter-engagement between said reel and said last mentioned core, thereby to maintain the reverse rotation of said reel during the reeling of the web therefrom on said core.

8. In apparatus of the class described, the combination of a drum for guiding a web to be reeled, means for elevating a reel-core from below said drum into engagement with the web guided thereby so as to cause reeling of said web on said core, horizontally movable means having a pair of reel-core engaging members movably mounted thereon and normally operative to engage and position a reel core in substantially fixed relation to such horizontally movable means, an auxiliary member movably mounted on such horizontally movable means in laterally spaced relation to said pair of members, means for effecting movement of said horizontally movable means and a reel carried thereby from said drum to discontinue the reeling of said web on said core, means for reversing the direction of rotation of said reel, means for operating said core elevating means to elevate another core into engagement with the web intermediate said drum and reel and to carry said last-mentioned core and the engaged portion of the web into engagement with said drum, thereby to initiate reeling of the web from both said drum and said reel on said last-mentioned core, means for effecting release of said reel from said pair of members and subsequent movement of said laterally movable means toward said drum and into operative engagement with said last-mentioned core, said laterally spaced member being operative to engage the core of said reel to incidentally effect movement of said reel into engagement with said core, whereby the reverse rotation of said reel will be continued to facilitate unwinding of the web from said reel and reeling thereof on said last-mentioned core to form a two-ply reel.

9. Apparatus of the class described comprising a horizontally movably mounted member provided with means for receiving and fixedly positioning a reel core thereon, a pair of vertically spaced rolls having the bight thereof horizontally aligned with the path of travel of a reel core carried by said member, said rolls being simultaneously engageable by such a reel core, means for driving said rolls, adjustable, constant force means for urging said member to move toward said rolls so as to carry a reel core into engagement with said rolls so as to be thereby driven, and means for reversing the direction of said constant force so as to effect movement of said horizontally movable member and reel core from said rolls.

10. In apparatus of the class described, a driven roll from which there is delivered a web to be wound, a pair of winding drums, separate electric motors independently driving said drums, means for independently controlling the relative speed of rotation at which said drums are driven by said motors, and means controlled by the speed of rotation of said driven roll for maintaining at a predetermined, substantially constant relationship, the speed at which said drums are driven and the speed of rotation of said driven roll, said last mentioned means comprising a generator actuated by said driven roll, a motor synchronized with and driven by said generator, and a voltage regulator controlled by said generator driven motor for controlling the voltage of electrical current delivered to said separate electric motors for energizing the same.

11. Apparatus of the class described comprising a rotatably driven drum for guiding a web, laterally movable means for supporting and holding a reel core in engagement with said drum so as to thereby effect rotation of said reel core and winding of said web on said core to form a reel, means operative when the reel has reached a predetermined size to effect movement of said laterally movable supporting means and the reel thereon from said drum, means for reversing the direction of rotation of said reel, means for delivering another reel core into engagement with the web passing from said drum to said reel and to carry the engaged web portion against said drum so as to start the reeling of the web from both said drum and reel on said other reel core, and means for returning said reel supporting means toward said drum to effect interengagement between said reel and said other core, thereby to maintain the reverse rotation of said reel during the reeling of the web therefrom on said core.

12. Apparatus according to claim 11 wherein the means for reversing the direction of rotation of the reel comprises an endless belt traveling around spaced pulleys, means for pivotally supporting said belt for rocking movement toward and from the reel to be reversed, means for effecting rocking of said belt into engagement with said reel, said belt being initially free running so as to be driven in one direction as a result of its engagement with said reel, and power means for driving said belt in the opposite direction, thereby to reverse the direction of rotation of said reel.

13. Apparatus according to claim 11 wherein the means for reversing the direction of rotation of the reel comprises an endless belt traveling around spaced pulleys, means for pivotally supporting said belt for rocking movement toward and from the reel to be reversed, means for effecting rocking of said belt into engagement with said reel, said belt being initially free running so as to be driven in one direction as a result of its engagement with said reel, power means for driving said belt in the opposite direction, thereby to reverse the direction of rotation of said reel, and a magnetic clutch connecting said power means with said belt for driving the same whereby stopping of the initial rotation of the reel and reversal of the direction of its travel is effected gradually upon energization of said clutch.

14. Apparatus of the class described, comprising a pair of vertically spaced rolls, means for driving said rolls, means for adjusting the drive of one of said rolls independently of the drive of the other, and means for horizontally movably supporting a reel in contact with both of said rolls.

15. Apparatus of the class described, comprising a pair of vertically spaced rolls, means for driving said rolls, means for adjusting the drive of one of said rolls independently of the drive of the other, means for horizontally movably supporting a reel in contact with both of said rolls, and means for urging said reel toward said rolls with a substantially constant force.

RUDOLF A. MORAVEK.